X0009574
W. Shultz,
Spark Arrester,
Patented Mar. 31, 1836.
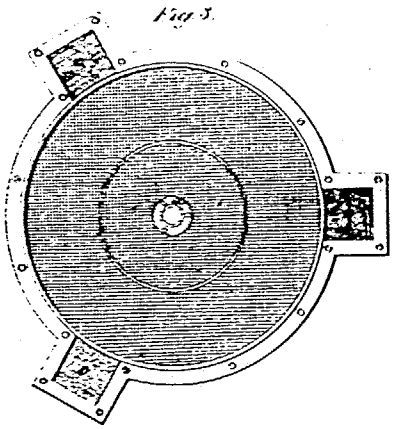
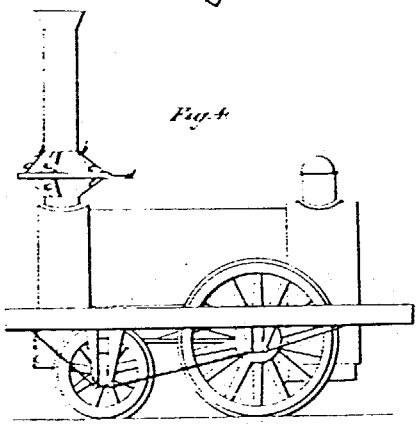
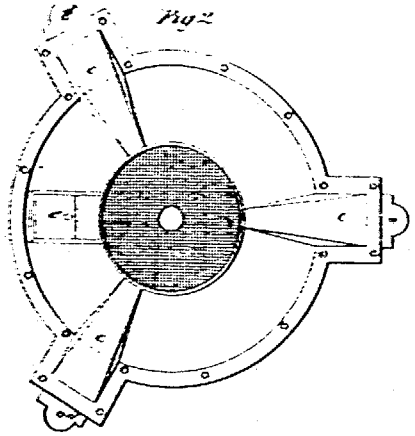
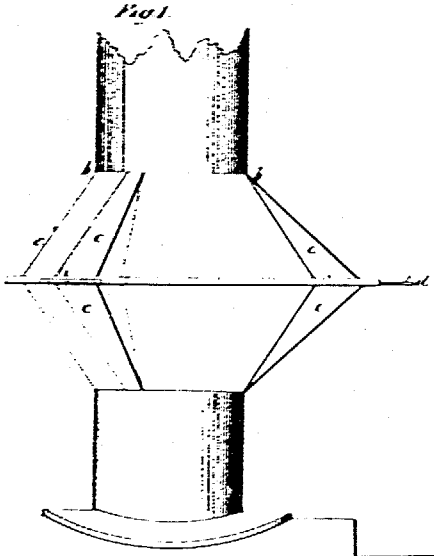
N. PETERS PHOTO-LITHOGRAPHER WASHINGTON D. C.

William Schultz
Letters Patent

The Schedule referred to in these Letters Patent and making part of the same containing a description in the words of the said William Schultz himself of his improvement in the Spark Catcher To all to whom these presents shall come. Be it known that I William Schultz of the County of Philadelphia in the State of Pennsylvania have invented a new and useful spark catcher for Locomotive Steam Engines and that the following is a full and exact description thereof. Immediately above or near the smoke box of the engine in the smoke pipe of the engine said pipe is made to swell in a conical form until the diameter becomes sufficient to present an area for gauze wire seive that will pass the draught of the engine without any practicable diminution thereof. The top of said cone terminates in a flange of sufficient projection for screw bolts or other fastenings for the upper part of said pipe hereinafter described. Upon the top of said flange to said cone a wire seive is placed where is fixed in the centre by the exhaust steam pipe which carries off the waste steam of the Engine. The wire seive is secured round the exhaust pipe by a flange projecting from said pipe upon which the wire rests and is compressed by an iron ring screwed down upon the top of said seive as represented in the drawing at a. fig 3. Immediately above the wire seive and the cone in the smoke pipe above described another cone similar to the one before mentioned is placed in an inverted position to it which contracts to the diameter of the main barrel of the pipe which is fastened to the last mentioned cone as represented in the drawing at b. b. Fig. 1 3 4. Upon the outside of the double cone thus formed as above stated in which the gauze wire is placed one or more flues are constructed as represented in the drawing at c. c. c. Fig. 1. 2. 3 4. with a [illegible]

door or valve to each as represented at d.d. Fig 1.2. 3 & 4. which
can be opened or shut at pleasure while the Engine is standing
and by which the draught can be regulated. though they are
to be shut while the Engine is in motion. In the upper part of
the double cone above described a door is constructed for the pur-
pose of examining or cleaning the gause cone at pleasure –
This door is represented in the drawings at x̂. Fig 1.2 & 4.
What I claim as my own invention and not previously
known in the above described machine is the whole arrange
ment as herein before described without any connexion
with any other machine heretofore constructed for the same
purposes. I do not confine myself to the exact shape of a
round cone for the smoke pipe below the gause cone &c. It
is for the principles and arrangement hereinbefore described
applied in any shape or proportion which I claim to be
my improvement William Schultz Witnesses
H. L. Campbell
[illegible] Goodman 552 [illegible]

Drawing

[illegible]